Nov. 24, 1942.                C. M. VERHAGEN                2,303,149
            RUBBER GLAZING STRIP FOR MULTIPLE GLASS SASH
                      Filed Jan. 20, 1940
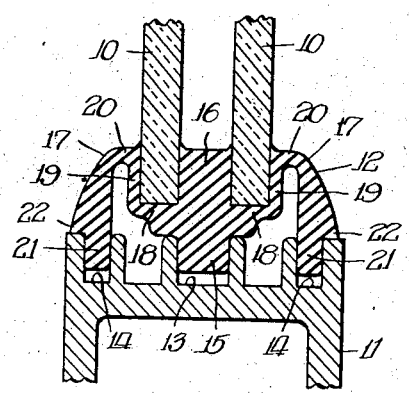
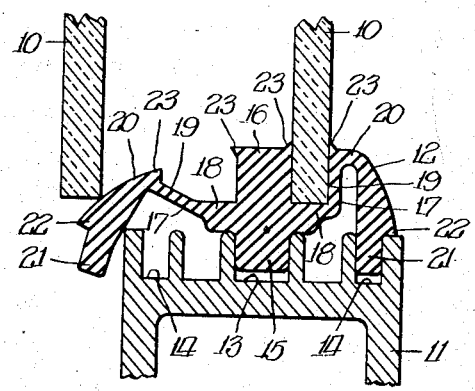
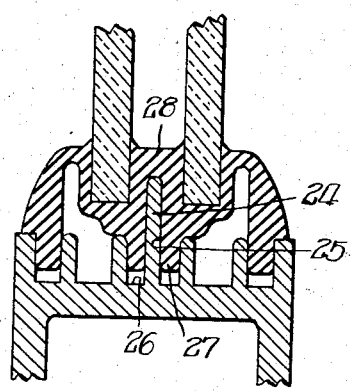
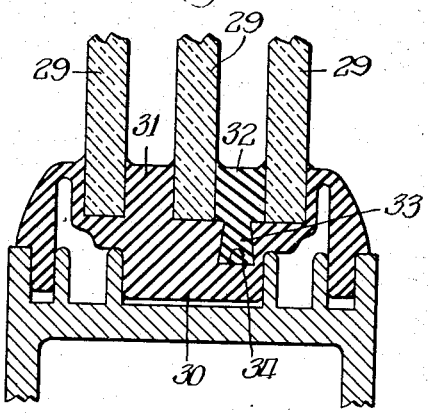
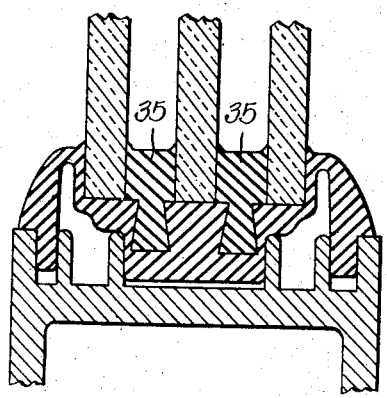
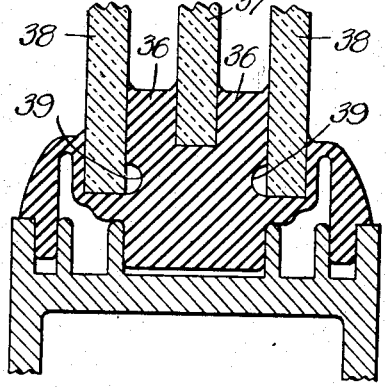
INVENTOR.
Christian M. Verhagen,
BY Cromwell, Greist & Warden
ATTORNEYS Patented Nov. 24, 1942

2,303,149

UNITED STATES PATENT OFFICE 2,303,149

RUBBER GLAZING STRIP FOR MULTIPLE GLASS SASH

Christian M. Verhagen, Elkhart, Ind., assignor to The Adlake Company, Chicago, Ill., a corporation of Illinois Application January 20, 1940, Serial No. 314,812

4 Claims. (Cl. 189—64)

This invention has to do with multiple glass sash of the type consisting of a frame and two or more spaced panes of glass, and is particularly concerned with the provision of improved glazing means for mounting the panes of glass in the frame.

The object of the invention is to provide, in a multiple glass sash of the type described, a rubber glazing strip which securely holds the panes of glass in the frame, completely seals off the edges of the panes, and permits ready removal of the panes for cleaning or replacement.

Other more specific objects and advantages of the invention will be evident to those skilled in the art upon a full understanding of the construction of the improved rubber glazing strip.

Several different forms of the invention are presented herein for the purpose of exemplification, but it will of course be appreciated that the invention may be embodied in still other structurally modified forms coming equally within the scope of the appended claims.

In the accompanying drawing:

Fig. 1 is a cross section through one of the rails of a multiple glass sash equipped with the improved rubber glazing strip of the invention;

Fig. 2 is a similar view, showing the manner in which either of the panes of glass may be readily removed; and Figs. 3 to 6 inclusive are views showing various modifications of the same invention.

The multiple glass sash shown in Figs. 1 and 2 consists of two panes 10 of glass, a metal frame 11, and a rubber glazing strip 12. The panes 10, which may be rectangular, round, or of any desired shape, are arranged in spaced parallel relation to each other; the frame 11, which is of the same shape as the panes, surrounds the latter; and the rubber glazing strip 12, which is of the special formation hereinafter described, is positioned between the edges of the panes and the frame.

The panes 10 are somewhat smaller than the inside of the frame 11, and are supported by the frame entirely through the medium of the interposed strip 12. The frame 11 is provided with an inwardly opening groove 13 at or near its center, and with two other inwardly opening grooves 14 near its sides, which grooves receive correspondingly located portions of the strip 12.

The strip 12 is removably seated in the frame 11 and completely spans the edges of both panes 10, in air-tight association with the frame and with the edges of both panes. The strip 12 is provided, near its center, with an outwardly projecting rib 15 which fits within the inwardly opening groove 13 in the frame 11, and is provided, also near its center, with an inwardly projecting rib 16 which extends between and uniformly spaces the edges of the panes 10. From these ribs the strip extends laterally in relatively thin oppositely directed side flaps 17, which flaps first extend across the edges of the panes at 18, then turn inwardly against the exposed faces of the panes at 19, then extend laterally for a short distance at 20 and then turn outwardly at 21 and enter the inwardly opening grooves 14 in the frame. The outwardly turned marginal portions 21 of the strip preferably increase gradually in thickness as they approach the grooves 14 and are characterized by shoulders 22 which overlie and abut solidly against the edges of the frame beyond the grooves 14.

When the marginal portions 21 of the strip are tucked into the grooves 14 in the frame they tend to remain in such grooves and are locked by the latter against lateral movement. The rib 15 affords an amply rigid anchorage for the assembled panes against any lateral movement with respect to the frame while at the same time cushioning the panes against any forces tending to move the same; the rib 16 uniformly spaces the panes and effectively seals off the insulating chamber between the panes; and the portions 18, 19 and 20 of the flaps 17 at the sides of the strip, in cooperation with the marginal portions 21 and the inwardly and outwardly ribbed center portion, furnish sling-like suspensions for the panes which sealingly support the panes and effectively cushion all jars and other forces to which the same are subjected.

To remove either of the panes it is merely necessary to pry the marginal portions 21 of the adjacent flap 17 out of its groove 14, whereupon the flap will assume the position shown in Fig. 2. By slightly depressing this flap the edge of the pane may be easily slid across and out from engagement with the same. After both panes have been removed the strip 12 can of course be withdrawn from its seat in the frame.

The edges of the spacing rib 16 and side flaps 17, where they engage with the panes 11, are preferably provided with small fin-like projections 23 which press tightly against the sides of the panes at those points.

The sash shown in Fig. 3 differs from the above described sash in the addition of an inwardly projecting flange 24 on the frame which fits within an outwardly opening groove 25 in the rubber glazing strip. The flange 24 extends from the center of the groove 26 for the anchoring rib 27 to a point in the spacing rib 28 in lapped relation to the edges of the panes. This modified arrangement obviously affords a more rigid support for the panes without interfering with removal of the same.

In the sash shown in Fig. 4 three panes 29 are employed instead of two, the centrally located anchoring rib 30 on the strip is made wider, the pane at one side of the assembly is spaced from the center pane by an integrally formed rib 31, and the pane at the other side is spaced from the center pane by a removable rib 32. The rib 32 is provided at its base with a tongue 33, preferably of dovetailed form, which fits within a correspondingly shaped groove 34 in the strip. After the pane at one side of the rib 32 has been removed the rib 32 can be withdrawn to permit removal of the center pane.

In the construction shown in Fig. 5 both of the spacing ribs 35 are made removable, in the same manner as the spacing rib 32 shown in Fig. 4.

In the construction shown in Fig. 6 neither of the spacing ribs 36 is removable but the center pane 37 is made slightly smaller than the side panes 38 and the bases of the spacing ribs 36 are undercut at 39, so that when either of the side panes 38 are removed the adjacent spacing rib 36 can be bent over to permit removal of the center pane.

From the foregoing description it will be appreciated that the improved rubber glazing strip, in addition to securely holding the panes, noiselessly absorbs all vibrations and jars, and seals the space or spaces between the panes quite effectively against the entrance of air, dust and moisture. The humped-up side flaps, by bearing resiliently at all times against the edges as well as the sides of the panes, insures snug contact of the rubber with the panes and also with the frame.

The frame 11 is preferably rounded in each of its corners to permit the strip 12 to extend all of the way around the four sides of the frame in one piece, but the strip can of course be cut if desired into lengths which are coextensive with the sides.

I claim:

1. In a multiple glass sash, two or more panes of glass, a frame about the panes provided with inwardly opening grooves, a single one-piece rubber glazing strip which spans the edges of the panes and is removably seated in the frame, said strip having a center portion which spaces the edges of the panes from each other, and having integral side portions which hold the panes in place against the center portion, said side portions permitting removal of the panes when depressed laterally, and being detachably interlocked within the grooves in the frame in such manner as to prevent their lateral depression.

2. In a multiple glass sash, two or more panes of glass, a frame about the panes provided with inwardly opening grooves, a single one-piece rubber glazing strip which spans the edges of the panes and is removably seated in the frame, said strip having a center portion which is anchored against lateral movement in one of the grooves of the frame and spaces the edges of the panes from each other, and having integral side portions which hold the panes in place against the center portion, said side portions permitting removal of the panes when depressed laterally, and being detachably interlocked within other of the grooves in the frame in such manner as to prevent their lateral depression.

3. In a multiple glass sash of the type consisting of a frame and two or more spaced panes of glass, a single one-piece rubber glazing strip which spans the edges of the panes and is removably seated in the frame, said strip having a portion which spaces the edges of the panes from each other, and having another integrally formed portion in detachably interlocked engagement with the frame which holds one of the panes in place against said spacing portion, said holding portion when withdrawn from its interlocked engagement with the frame being movable into an out-of-the-way position to permit removal of said pane.

4. In a multiple glass sash, a frame provided with an inwardly opening groove, two or more panes of glass of smaller size than the inside dimensions of the frame, a single one-piece rubber glazing strip which spans the edges of the panes and is removably seated in the frame, said strip having a portion which spaces the edges of the panes from each other, and having another integrally formed portion which removably fits into the groove in the frame in detachably interlocked engagement with the latter and holds one of the panes in place against said spacing portion, said holding portion when withdrawn from its interlocked engagement within the groove being movable into an out-of-the-way position to permit removal of said pane.

CHRISTIAN M. VERHAGEN.